Nov. 11, 1947.　　　　L. L. JOHNSON　　　　2,430,640

INDUCTION HEATING SYSTEM WITH ALTERNATELY ENERGIZED COAXIAL CONDUCTORS

Filed May 31, 1945　　　　2 Sheets-Sheet 1

Inventor
Lauren L. Johnson
by Didier Journeaux
Attorney

Nov. 11, 1947.    L. L. JOHNSON    2,430,640
INDUCTION HEATING SYSTEM WITH ALTERNATELY ENERGIZED COAXIAL CONDUCTORS
Filed May 31, 1945    2 Sheets-Sheet 2

Inventor
Lauren L. Johnson
by Didier Journeaux
Attorney

Patented Nov. 11, 1947

2,430,640

UNITED STATES PATENT OFFICE 2,430,640

INDUCTION HEATING SYSTEM WITH ALTERNATELY ENERGIZED COAXIAL CONDUCTORS

Lauren L. Johnson, La Grange, Ill., assignor to Allis-Chalmers Manufacturing Company, Milwaukee, Wis., a corporation of Delaware Application May 31, 1945, Serial No. 596,829

9 Claims. (Cl. 13—27)

This invention relates in general to improvements in electric heating systems, and more particularly to means for supplying heating current to an electrically conductive object by induction through a converting system comprising a plurality of alternately operating circuits.

Induction heating systems supplied from a source of direct current or of low frequency alternating current often utilize a converting system in which current is transmitted through a plurality of alternately operating circuits as a result of the control of the flow of current by means of electric valves. The circuits may be severally connected to different sections of the heating inductor which are bridged by a capacitor for supplying the magnetizing component of the inductor exciting current and also the commutating current for the valves. In such systems it is generally desirable from the point of view of economy to cause the converter to supply current at a voltage of the order of magnitude of at least 1000 volts, while the cost of capacitors per rated kv.-a. is lowest for voltages of the order of magnitude of a few hundred volts. In addition, to facilitate commutation between the valves of the converter, the coupling of the valve circuits with each other and with any circuit to which the commutating capacitor may be connected should be as close as possible to unity. Stated otherwise, the leakage reactance of each circuit with respect to the others should be as low as practicable.

It is therefore advantageous to energize the alternating operating circuits of the converter at relatively high voltage and to connect them with separate inducing coils of the heating inductor, the commutating capacitor being connected with an induced coil of the inductor operating at a relatively low voltage. The inducing coils then carry only the load component of the inductor current and may therefore have a relatively small cross section. The leakage reactances of the coils are made relatively low by arranging these different coils to be coextensive in their length. Further reduction of the leakage reactances may be obtained by building the alternately operating inducing coils from coaxial conductors and also by forming the induced coil of a hollow conductor surrounding the coaxial inducing coils. The induced coil then also shields the high voltage inducing coils and prevents accidental contact of the operator therewith.

It is therefore an object of the present invention to provide a heating system in which the load component of the exciting current is supplied to an inductor at one voltage and the magnetizing component is supplied at another voltage.

Another object of the present invention is to provide a heating system to which current is supplied through a plurality of inductor coils and in which the coupling between the different inductor coils is close to unity.

Another object of the present invention is to provide a heating system in which a high voltage inductor coil is shielded by a low voltage coil in inductive relation therewith.

Another object of the present invention is to provide a heating system in which the load component of the exciting current is conductively supplied to an inducing coil and the magnetizing and commutating current components are supplied by a capacitor inductively connected with the inducing coil.

Objects and advantages other than those above set forth will be apparent from the following description when read in connection with the accompanying drawing, in which:

Fig. 1 diagrammatically illustrates a heating system comprising a frequency converter of the electric valve type having a pair of alternately operating output circuits connected to a pair of cooperating inductor coils;

Fig. 2 diagrammatically illustrates a modified heating system comprising a frequency converter of the electric valve type having three pairs of alternately operating output circuits severally connected to three pairs of cooperating inductor coils;

Figure 1:
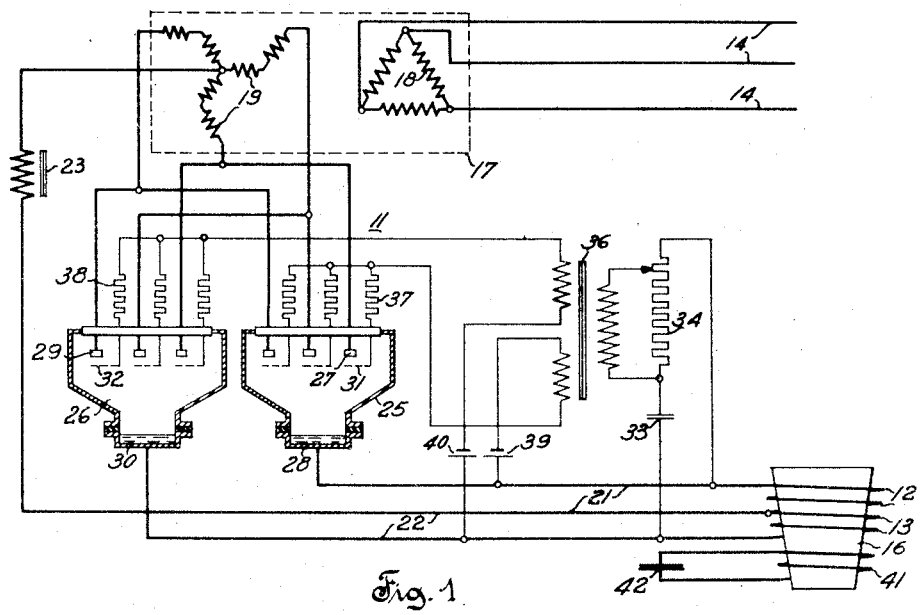

Referring more particularly to the drawing by characters of reference, Fig. 1 diagrammatically illustrates a converter 11 of the electric valve type for supplying current of relatively high frequency to a pair of inductor coils 12, 13 from a supply circuit 14 energized from any suitable generator (not shown) operating at a relatively low frequency. Coils 12, 13 are adapted to be placed in inductive relation with an electrically conductive object to be heated by induction of heating currents therein such as a mass of metal contained within a crucible 16.

Converter 11 may be of any known type comprising a pair of alternately operating output circuits including electric valves for converting currents from circuit 14 into current impulses and comprises a transformer 17 having a primary winding 18 divided into a plurality of phase portions severally connected with the different conductors of circuit 14. The secondary winding 19 of transformer 17 is divided into a plurality of phase portions defining a neutral point and so arranged as to preclude dissymmetrical magnetization of the core upon flow of unidirectional currents in sequence through the different winding portions.

Each terminal of winding 19 is connected with coils 12, 13 through a pair of alternately operating circuits 21, 22 having a common conductor connected with the neutral point of winding 19 through an inductive reactor 23. The different terminals of winding 19 are connected with circuit 21 through a plurality of electric valves 25 and with circuit 22 through a second plurality of electric valves 26. The valves are preferably of the discontinuously controllable mercury vapor type of size and design appropriate for the operation thereof in connection with inductors 12, 13. The anodes 27 of valves 25 may be assembled with the associated cathodes in separate casings, or the different anodes may be arranged in a common casing provided with a common cathode 28. Each anode 27 of valves 26 may likewise be assembled with the associated cathode in a separate casing, or the anodes may be arranged in a common casing provided with a common cathode 30. The cathodes are provided with the usual means (not shown) for initiating and maintaining the emission of electrons thereat.

The conductivity of valves 25, 26 may be controlled by means of suitable control electrodes 31, 32 which may be grids when the continuously emissive type of cathode is provided. Grids 31, 32 may be energized from circuits 21, 22 through a phase shifting circuit comprising a capacitor 33 and a resistor 34 associated with a transformer 36 and current limiting resistors 37, 38. The grid circuits may also include sources of negative unidirectional potential conventionally represented as batteries 39, 40. Coils 12, 13 are in inductive relation with a secondary coil 41 connected with a capacitor 42.

The system being connected as illustrated in Fig. 1, batteries 39, 40 maintain valves 25, 26 nonconductive even when circuit 14 is energized. The action of batteries 39, 40 may be momentarily overcome and at the same time oscillations may be caused to appear in circuits 21, 22 in any known manner to place the system in normal operation. In the course of such normal operation, the different phase portions of winding 19 supply current in sequence to circuits 21, 22 through valves 25, 26. While a particular phase portion of winding 19 is carrying current, the valves connected therewith are rendered alternately conductive and nonconductive by the alternating potential component impressed on the grids thereof from transformer 36. The flow of current from transformer 19 is thereby caused to alternate between the path comprising one of valves 25, circuit 21 and coil 12 and the path comprising one of valves 26, circuit 22 and coil 13.

As a result of the connection of transformer 36 with circuits 21, 22 through a phase shifting circuit, each valve is rendered conductive by the associated grid before the flow of current through the other valve has ceased. Two valves are thus momentarily caused to operate in parallel while the total current intensity through the valves is prevented from varying rapidly by reactor 23. Capacitor 42 then supplies to circuits 21, 22 a commutating current component which causes the current in the outgoing valve to drop momentarily to zero, so that the outgoing valve may be rendered nonconductive by the action of the potential impressed on the grid thereof.

The same operation is repeated sequentially with respect to the different phase portions of winding 19 during each cycle of the voltage of circuit 14 to cause circuits 21, 22 to be supplied with current of constant frequency and substantially uniform intensity. This current flows in coils 12, 13 and induces heating current in the charge contained within crucible 16 or in any other electrically conductive object inductively associated with the coils. Capacitor 42 is inductively coupled with circuits 21, 22 through coils 12, 13 and 41 to impart to circuit 21, 22 a capacitive character. The capacitor thus supplies the magnetizing component of the inductor current, and circuits 21, 22 only supply the load component utilized for the production of heat in the charge, which load component is relatively small compared to the magnetizing component.

To facilitate the commutation process, the commutating current should be supplied to circuits 21, 22 from capacitor 42 through connections having a low resistance and a low inductive reactance. The coupling between coils 12, 13, 41 should therefore be made close to unity, which means that the leakage reactance of each coil with respect to the others should be made as low as practicable. While the coils have been shown axially juxtaposed in Fig. 1 to clarify the drawing, they should be at least coextensive in length to meet the above mentioned conditions.

Figure 3:
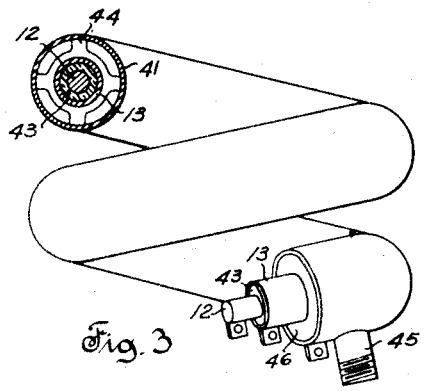
Figs. 3 to 5 are views in elevation of portions of different embodiments of inductors comprising coaxial conductors.

In the embodiment of inductor shown in Fig. 3, coil 12 consists of a helically wound elongated conductor and coil 13 of a hollow conductor surrounding conductor 12 coaxially therewith and separated therefrom by suitable insulation 43. Coil 41 consists of a hollow conductor surrounding conductor 13 coaxially therewith and separated therefrom by suitable insulation 44. Conductor 41 may be provided with means for causing a flow of cooling fluid such as water or oil therethrough and around conductor 13. For this purpose, conductor 41 may be provided with a suitable nipple 45 to be connected with a source of cooling fluid and insulation 44 is so shaped as to define passages for the flow of cooling fluid.

If the fluid is not substantially conducting, insulation 44 may consist of a series of spacers permitting direct contact between the cooling fluid and conductors 13, 41. Each end of conductor 41 must be sealed by an insulating washer 46 or equivalent means. The different conductors are provided with suitable terminals for the connection thereof with the circuits of the system. As a result of the coaxial arrangement of coils 12, 13, 41, the three coils are coextensive in all directions and the inductive relation thereof is assured while their leakage reactances are a minimum.

In the inductor illustrated in Fig. 3, the three coils have the same number of turns so that the voltage impressed on capacitor 42 is equal to one-half the voltage between the non-common conductors of circuits 21, 22. To further decrease the voltage of the capacitor the coils may be so arranged as to present the conductor cross section shown in Fig. 8. In the latter figure conductor 41 is a tube of sufficient diameter to contain side by side a plurality of pairs of coaxially disposed conductors which are connected in series to form coils 12 and 13. Conductor 13 is then coated with a continuous layer of insulation 47 for the reason that the different adjacent sections of conductor 13 are at different potentials. Cooling fluid may be caused to flow in the spaces between conductor 41 and insulation 47.

Figure 4:
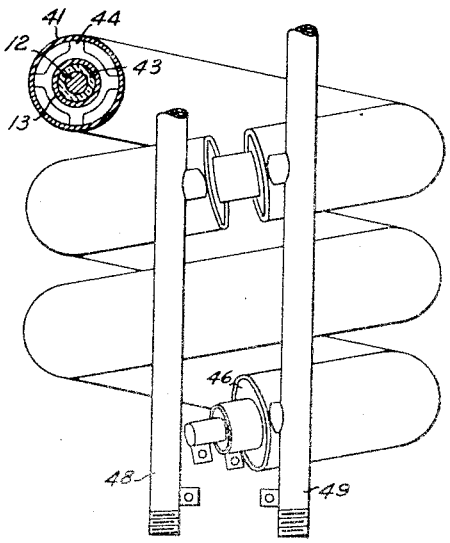

As an alternative arrangement either conductors 12, 13 or conductor 41 may be interrupted at least at one intermediate point of the coil to define a plurality of sections which are connected in parallel. Fig. 4 shows conductor 41 interrupted at least at one point to form a plurality of sections. The sections are connected electrically in parallel by means of a pair of longitudinal conductors 48, 49 which are connected to the ends of the sections. Conductors 48, 49 may consist of pipe sections connected with the sections of conductor 41 through nipples, and one of conductors 48, 49 may be connected with a source of cooling fluid to cause the flow of fluid through the different sections of conductor 41 in parallel.

Figure 5:
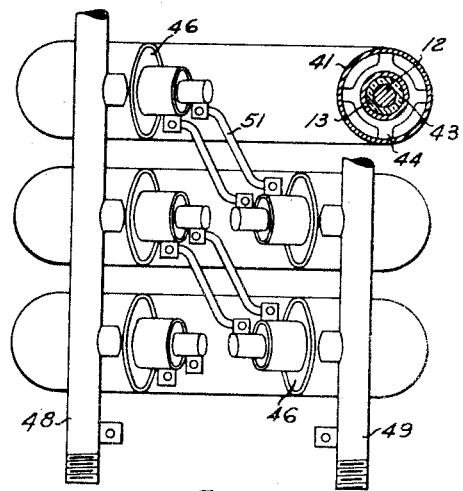

In the embodiment illustrated in Fig. 5 conductors 12, 13 consist of a plurality of pairs of coaxially disposed inner and outer conductor sections, each pair being wound to form a single flat or helical turn of a coil comprising a plurality of adjacent turns. Coil 41 likewise consists of a plurality of hollow conductor sections severally surrounding the pairs of conductor sections of coils 12, 13. Adjacent sections of coils 12, 13 are interconnected by means of jumpers 51, each inner conductor of each section being preferably connected in series with the outer conductors of the adjacent sections and each outer conductor of each section being connected in series with the inner conductors of the adjacent sections so as to equalize the leakage reactances of coils 12, 13. All the inner coil sections may also be connected in series, the outer coil sections then being likewise connected in series. The sections of conductor 41 may be connected in series, in series parallel or in parallel. As shown in Fig. 5, pipes 48, 49 connect the sections of conductor 41 electrically in parallel and conduct cooling fluid to the different sections also in parallel.

Figure 6:
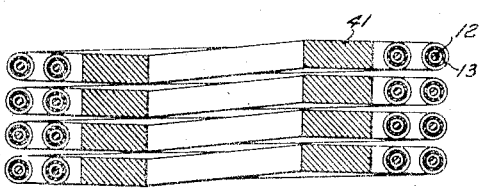

In the embodiment illustrated in Fig. 6, coil 41 is wound inside of the coil formed by the coaxial combination of conductors 12, 13 so that both coils are coextensive in length and have a low leakage reactance.

Figure 7:
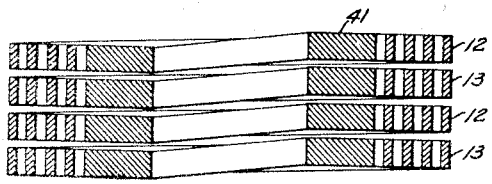
Figs. 6 and 7 are views in axial cross section of portions of two further embodiments of inductor coils.

In the embodiment illustrated in Fig. 7, the conductors of coils 12, 13 are wound in interleaved layers about coil 41 and all three coils are coextensive in length and have a low leakage reactance. The cooling of the conductors of the embodiments illustrated in Figs. 7 and 8 may be effected in any known manner.

Although all the inductors illustrated in Figs. 3 to 7 are shown as cylindrical coils, it will be apparent that inductors embodying the features of such coils may be made of any shape required for the proper induction of heating current within the object to be heated, and may even consist of straight conductor sections in some instances.

Figure 2:
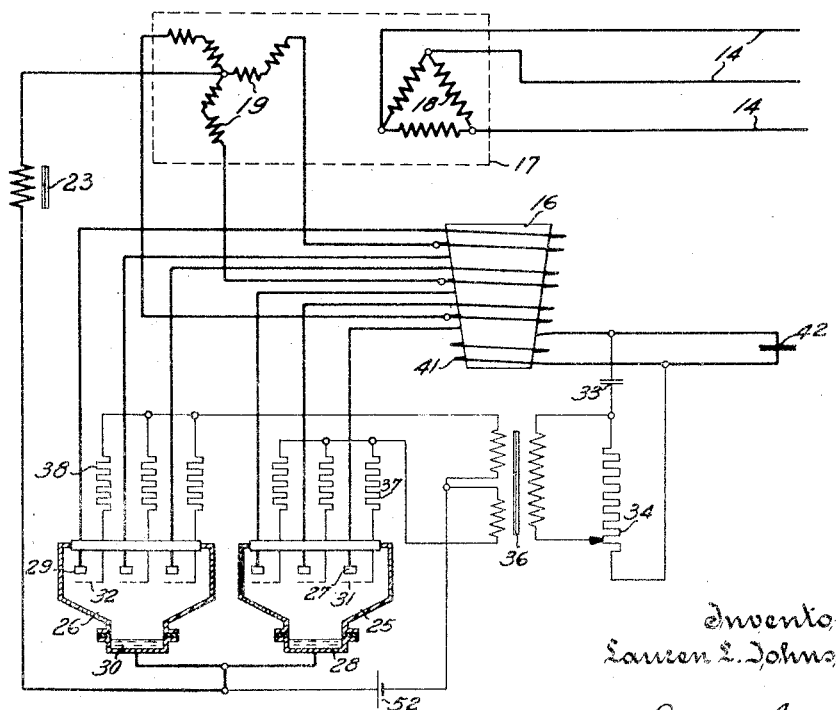
Figure 8:
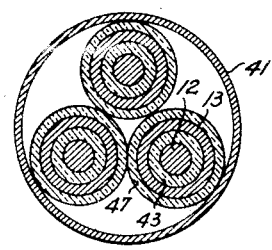
Fig. 8 is a view in transverse cross section through the conductors of an inductor coil comprising three pairs of coaxial conductors.

The heating system diagrammatically illustrated in Fig. 2 differs mainly from a system illustrated in Fig. 1 in that separate pairs of alternately operating circuits are associated with each phase portion of winding 19 and connected between the terminals of winding 19 and the anodes of the associated valves. Each pair of circuits comprises a pair of inductor coils, the different inductor coils being inductively related with coil 41 by arranging the conductors of the different coils as shown in Fig. 8, for example. Cathodes 28, 30 are directly interconnected so that the grid circuits require only a single source of unidirectional potential component represented as a battery 52. The operation of the system illustrated in Fig. 2 is entirely similar to that of the system illustrated in Fig. 1.

Although but a few embodiments of the present invention have been illustrated and described, it will be apparent to those skilled in the art that various changes and modifications may be made therein without departing from the spirit of the invention or from the scope of the appended claims. Some of the features disclosed herein are claimed in a copending application of L. L. Johnson, S. N. 596,830, filed May 31, 1945.

It is claimed and desired to secure by Letters Patent:

1. In a system comprising a source of electric current for heating an electrically conductive object by induction of current therein, the combination of a current converting system comprising a pair of circuits for converting current from said source into current impulses alternately supplied to said circuits, and an inductor for inducing heating current in said object comprising a pair of coaxially disposed conductors severally connected with said circuits to alternately receive exciting current therefrom.

2. In a system comprising a source of electric current for heating an electrically conductive object by induction of current therein, the combination of a current converting system comprising a pair of circuits for converting current from said source into current impulses alternately supplied to said circuits, and an inductor for inducing heating current in said object comprising a conductor connected with one of said circuits and wound as a coil and a second conductor connected with the other of said circuits and wound as a second coil substantially coextensive with the first said coil.

3. In a system comprising a source of electric current for heating an electrically conductive object by induction of current therein, the combination of a current converting system comprising a pair of circuits for converting current from said source into current impulses alternately supplied to said circuits, and an inductor for inducing heating current in said object comprising a pair of coils severally connected with said circuits to alternately receive exciting current therefrom, a winding in inductive relation with said coils, and a capacitor connected with said winding for supplying the magnetizing component of said exciting current.

4. In a system comprising a source of electric current for heating an electrically conductive object by induction of current therein, the combination of a current converting system comprising a pair of circuits for converting current from said source into current impulses alternately supplied to said circuits, and an inductor for inducing heating current in said object comprising a pair of substantially coextensive coils severally connected with said circuits to alternately receive exciting current therefrom, a winding substantially coextensive with said coils in inductive relation thereto, and a capacitor connected with said winding for supplying the magnetizing component of said exciting current.

5. In a system comprising a source of electric current for heating an electrically conductive object by induction of current therein, the combination of a current converting system comprising a pair of circuits for converting current from said source into current impulses alternately supplied to said circuits, and an inductor for inducing heating current in said object comprising a pair of coaxially disposed conductors severally connected with said circuits to alternately receive exciting current therefrom, a third conductor coaxially disposed with respect to said pair of conductors, and a capacitor connected with said third conductor for supplying the magnetizing component of said exciting current.

6. In a system comprising a source of electric current for heating an electrically conductive object by induction of current therein, the combination of a current converting system comprising a pair of electric valves connected with said source for converting current from said source into current impulses, an inductor for inducing heating current in said object comprising a pair of coils severally connected with said valves to receive exciting current therefrom, a winding in inductive relation with said coils, and a capacitor connected with said winding for supplying the magnetizing component of said exciting current and for supplying commutating current to said valves.

7. In a system comprising a source of electric current for heating an electrically conductive object by induction of current therein, the combination of a current converting system comprising a pair of electric valves connected with said source for converting current from said source into current impulses, an inductor for inducing heating current in said object comprising a pair of substantially coextensive coils severally connected with said valves to alternately receive exciting current therefrom, a winding substantially coextensive with said coils in inductive relation thereto, and a capacitor connected with said winding for supplying the magnetizing component of said exciting current and for supplying commutating current to said valves.

8. In a system comprising a source of electric current for heating an electrically conductive object by induction of current therein, the combination of a current converting system comprising a pair of electric valves connected with said source for converting current from said source into current impulses, an inductor for inducing heating current in said object comprising a pair of coaxially disposed conductors severally connected with said valves to alternately receive exciting current therefrom, a third conductor coaxially disposed with respect to said pair of conductors, and a capacitor connected with said third conductor for supplying the magnetizing component of said exciting current and for supplying commutating current to said valves.

9. In a system comprising a source of electric current for heating an electrically conductive object by induction of current therein, the combination of a current converting system comprising a pair of electric valves connected with said source for converting current from said source into current impulses, an inductor for inducing heating current in said object comprising a pair of coils severally connected with said valves to receive exciting current therefrom, a winding in inductive relation with said coils, a capacitor connected wth said winding for supplying the magnetizing component of said exciting current and for supplying commutating current to said valves, and means for controlling the conductivity of said valves comprising control electrodes of said valves and connections between said control electrodes and said winding.

LAUREN L. JOHNSON.

REFERENCES CITED

The following references are of record in the file of this patent:

UNITED STATES PATENTS

| Number | Name | Date |
| --- | --- | --- |
| 133,099 | Hay | Nov. 19, 1872 |
| 496,208 | Procunier | Apr. 25, 1893 |
| 1,378,187 | Northrup | May 17, 1921 |
| 1,631,667 | Beckmann | June 7, 1927 |
| 1,744,983 | Northrup | Jan. 28, 1930 |
| 1,795,136 | Northrup | Mar. 3, 1931 |
| 1,822,539 | Northrup | Sept. 8, 1931 |
| 1,833,617 | Northrup | Nov. 24, 1931 |
| 1,844,501 | Davis | Feb. 9, 1932 |
| 2,181,899 | Kennedy | Dec. 5, 1939 |
| 2,382,435 | Mauu et al. | Aug. 14, 1945 |

FOREIGN PATENTS

| Number | Country | Date |
| --- | --- | --- |
| 510,005 | Great Britain | July 17, 1939 |